(12) United States Patent
Butler et al.

(10) Patent No.: US 9,156,192 B2
(45) Date of Patent: Oct. 13, 2015

(54) MICRO-EROSION PROCESS FOR CONTROLLING VARIABLE CRUMB RUBBER MESH SIZE

(75) Inventors: Andy Butler, Chester (CA); Devron Kobluk, Brandon (CA)

(73) Assignee: BLUE DIAMOND TECHNOLOGIES, LTD., Winnipeg (CA)

( * ) Notice: Subject to any disclaimer, the term of this patent is extended or adjusted under 35 U.S.C. 154(b) by 594 days.

(21) Appl. No.: 13/474,346

(22) Filed: May 17, 2012

(65) Prior Publication Data

US 2012/0223167 A1    Sep. 6, 2012

Related U.S. Application Data

(63) Continuation-in-part of application No. 12/694,995, filed on Jan. 27, 2010, now Pat. No. 8,317,115.

(60) Provisional application No. 61/160,381, filed on Mar. 16, 2009.

(51) Int. Cl.
| | |
|---|---|
| *B29B 17/04* | (2006.01) |
| *B02C 19/06* | (2006.01) |
| *B02C 25/00* | (2006.01) |
| *B29K 21/00* | (2006.01) |

(Continued)

(52) U.S. Cl.
CPC .............. *B29B 17/0404* (2013.01); *B02C 19/06* (2013.01); *B02C 25/00* (2013.01); *B02C 2201/04* (2013.01); *B29B 2017/0428* (2013.01); *B29K 2021/00* (2013.01); *B29K 2105/06* (2013.01); *B29K 2705/12* (2013.01); *B29L 2030/00* (2013.01); *Y02W 30/625* (2015.05)

(58) Field of Classification Search
CPC .................. B02C 19/06–19/068; B02C 25/00; B02C 2201/04
USPC .................................................. 241/39, 40, 33
See application file for complete search history.

(56) References Cited

U.S. PATENT DOCUMENTS

| | | | |
|---|---|---|---|
| 4,863,106 A * | 9/1989 | Perkel ............................... 241/5 |
| 5,115,983 A | 5/1992 | Rutherford, Sr. | |

(Continued)

FOREIGN PATENT DOCUMENTS

| | | |
|---|---|---|
| CA | 2105581 A1 | 9/1992 |
| CN | ZL200610096128.8 | 9/2006 |
| WO | WO 2009/068874 A2 | 6/2009 |

OTHER PUBLICATIONS

U.S. Appl. No. 13/060,108, filed Jul. 14, 2011, Verri, Roberto.

(Continued)

*Primary Examiner* — Faye Francis
(74) *Attorney, Agent, or Firm* — Dorsey & Whitney LLP; Stuart R. Hemphill

(57) ABSTRACT

The present invention is Micro-erosion Recovery System for separating recyclable tire materials (rubber, steel and fiber) and complying with quality standards governing the use of recovered tire materials. It is also a highly efficient apparatus and system for producing large amounts of high quality crumb rubber and steel. The system is controlled by selecting a micro erosion water jet nozzle with a specific cross-sectional area of the inlet and continually taking measurements of the inlet pressure until ideal mesh size of crumb rubber is met. Using the inlet pressure and cross-sectional area of the inlet, the remaining variables are able to be calculated by using an equation known in the art.

8 Claims, 10 Drawing Sheets

(51) Int. Cl.
    *B29K 105/06*     (2006.01)
    *B29K 705/12*     (2006.01)
    *B29L 30/00*     (2006.01)

(56) References Cited

U.S. PATENT DOCUMENTS

| | | |
|---|---|---|
| 5,341,996 A | 8/1994 | Rutherford, Sr. |
| 5,482,215 A | 1/1996 | Veres |
| 5,683,038 A | 11/1997 | Shinal |
| 5,794,861 A | 8/1998 | Rutherford, Sr. |
| 6,435,435 B1 | 8/2002 | Mazurkiewicz |
| 6,601,788 B2 | 8/2003 | Garner |
| 2010/0230521 A1 | 9/2010 | Butler et al. |
| 2011/0163190 A1* | 7/2011 | Verri .................. 241/15 |
| 2011/0168818 A1 | 7/2011 | Verri |

OTHER PUBLICATIONS

U.S. Appl. No. 13/060,526, filed Jul. 7, 2011, Verri, Roberto.
U.S. Appl. No. 12/694,995, filed Sep. 16, 2010, Butler et al.

\* cited by examiner

MICRO-EROSION PROCESS FOR CONTROLLING VARIABLE CRUMB RUBBER MESH SIZE

CROSS-REFERENCE TO RELATED APPLICATIONS

This application is a continuation-in-part of U.S. Nonprovisional application Ser. No. 12/694,995 filed Jan. 27, 2010, now U.S. Pat. No. 8,317,115, which claims priority to U.S. Provisional Application No. 61/160,381, filed Mar. 16, 2009, both of which are hereby incorporated by reference in their entirety.

FIELD OF INVENTION

The present invention relates to the field of tire recycling systems and more particularly to a micro-erosion recovery system (MERS) for tire materials.

TERMS OF ART

Figure 1:
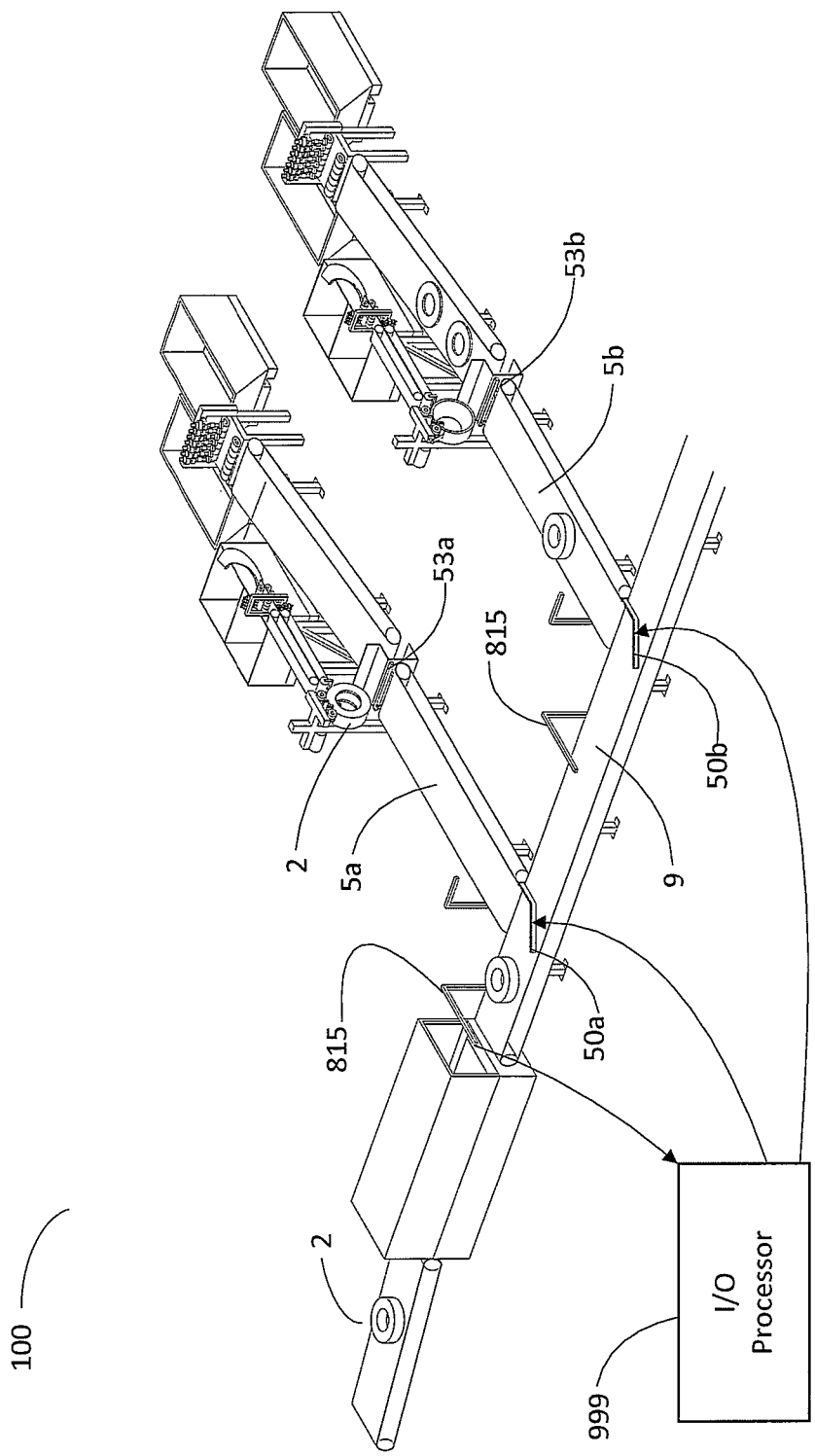
FIG. 1 illustrates a perspective view of an exemplary embodiment of two adjacent units of an MERS system.

As used herein, the term "sidewall" refers to the portion of a tire between the tread and rim of a tire. A sidewall may be comprised of rubber, steel (or other metal), fiber, Kevlar™ and functionally equivalent materials.

As used herein, the term "crumb rubber" refers to recycled rubber that has been reduced to particles.

As used herein, the term "steel bead" refers to a portion of the tire against the rim that holds the tire on the rim.

As used herein, the term "recoverable metal" refers to metal that is embedded in the tread of the tire and must be removed during the micro-erosion process.

As used herein, the term "tread" refers to the distance from a point on the tread surface measured perpendicularly to the material covering the steel belt, and which is measurable by a sensor.

As used herein, the term "shoulder" refers to the portion of the tire which is the transition area between the sidewalls and the tread. A shoulder may be comprised of rubber, steel (or other metal) and fiber and functionally equivalent materials.

As used herein, the term "I/O processor" refers to computer processing component which uses sensed data or use input to calculate the values of $P_1$, $P_2$, $V_1$, $V_2$, $A_1$, $A_2$, and Q to update the values of component control objects used to control MER system components.

As used herein a "component control object" is a data structure containing data which is used by a MERS system to complete the micro-erosion process.

As used herein, the term "robotic arm" refers to any mechanical component for facilitating the linear or non-linear movement of a tire.

As used herein, the term "robotic sweeping arm" refers to a mechanical component which pushes a tire onto processing channels.

As used herein the term "robotic grasping arm" refers to the non-linear movement of a mechanical component positions a tire.

As used herein, the term "mesh size" refers to the number of openings per (linear) inch of mesh.

As used herein, the term "micro-erosion" refers to the act of eroding or breaking rubber into to a mesh, particles, pieces, powder or dust. which water or other fluid pressure is applied to a surface causing the surface erode into smaller particles, pieces, mesh or powder. Micro-erosion breaks the particles into a range from 10 mesh to 500 mesh.

As used herein, the term "central conveyor" is an mechanical component that moves a tire from one processing channel to another.

As used herein, the term "processing channel" means a surface and configuration of water jets used to apply a micro-erosion recovery process to a tire.

As used herein, the term "recovery" means the process of removing the rubber from the steel to produce crumb rubber.

As used herein, the term "inlet pressure" or "$P_1$" means pressure measured at a specific point of the nozzle referred to as the inlet point. Inlet pressure is measured in psi or kPa.

As used herein, the term "outlet pressure" or "$P_2$" means pressure measured at a specific point of the nozzle referred to as the outlet point. Outlet pressure is measured in psi or kPa.

As used herein, the term "fluid density" is the variable specific weight of a fluid, or the density of water in a specific MERS location. Fluid density is measured in kg/m$^3$.

As used herein, the term "inlet velocity" or "$V_1$" is the value obtained by measuring the speed of water at a specific point of the nozzle referred to as the inlet point. Inlet velocity is measured in m/s.

As used herein, the term "outlet velocity" or "$V_2$" is the value obtained by measuring the speed of water at a specific point of the nozzle referred to as the outlet point. Outlet velocity is measured in m/s.

As used herein, the term "inlet point" refers to a variable as measured at a define point at the inlet of a nozzle.

As used herein, the term "outlet point" refers to a variable as measured at a define point at the outlet of a nozzle.

As used herein, the term "$A_1$" is the cross-sectional area of the inlet. The cross-sectional area is measured in m$^2$.

As used herein, the term "$A_2$" is the cross-sectional area of the orifce (vena contracta). The cross-sectional area is measured in m$^2$.

As used herein, the term "Q" is the volumetric flow rate measured at a point upstream of the water flow. The volumetric flow rate is measured in m$^3$/s.

As used herein, the term "distance from tire tread" is the distance of the nozzle relative to the tire surface. The distance from the tire varies proportionally according to $P_1$, $P_2$, $V_1$, $V_2$, $A_1$, $A_2$, and Q.

As used herein, the term "angle of the nozzle" is the degree of nozzle off perpendicular relative to the tire tread. The angle of the nozzle will be measure in degrees starting at 90 degrees or top dead and moving downward toward 0 degrees. As the angle decreases, taking in $P_1$, $P_2$, $V_1$, $V_2$; $A_1$; $A_2$; and Q, the micron size of the particle will decrease however through-put will be sacrificed.

As used herein, the term "micro-erosion water jet nozzle" is a converging diverging nozzle where a sensor is located for which the variables may be measured $P_1$, $P_2$, $V_1$, $V_2$, $A_1$, $A_2$, and Q.

Background

Water-jet processes for reclaiming rubber from used tires are known in the art; however, these methods cannot control the mesh size of the rubber produced. Mesh refers to material that has been sized by passing through a screen with a given number of holes per inch. For example, 10 mesh crumb rubber has passed through a screen with 10 holes per inch resulting in rubber granulate that is slightly less than 1/10 of an inch. The exact size will depend on the size of wire used in the screen.

Generally, the price for which recovered rubber and steel can be sold depends upon mesh and the level of contaminants in the product. It is therefore desirable to reduce the levels of contaminants in the product and control the mesh of the crumb rubber.

Current processes generally recover approximately 78-92 percent of the total rubber material in a tire, but the quality of rubber is substandard for many commercial uses. The end-product rubber contains significant metal contaminant and iron oxide contaminants. These contaminants prevent the rubber from meeting the requirements for end-uses for any high-end products.

The American Society for Testing and Materials (ASTM), which is an international organization charged with developing standards for rubber and other materials, promulgates standards for rubber which dictate the uses for recovered rubber. ASTM standards establish the level of contaminants and other materials.

Crumb rubber, or recycled rubber that has been reduced to particles, is the most valuable type of recycled rubber. The size of the particles is referred to as "mesh size."

Tyler mesh size is the number of openings per (linear) inch of mesh. To calculate the size of the openings in a mesh the thickness of the wires making up the mesh material must be taken into account. In practice, mesh openings are determined referring to a chart like the one below which uses a scale known as the Tyler mesh scale:

| Sieve size (mm) | BSS | Tyler (approx) | US (approx) |
| --- | --- | --- | --- |
| 4.75 | — | 4 | 4 |
| 3.35 | 5 | 6 | 6 |
| 2.81 | 6 | 7 | 7 |
| 2.38 | 7 | 8 | 8 |
| 2.00 | 8 | 9 | 10 |
| 1.68 | 10 | 10 | 12 |
| 1.40 | 12 | 12 | 14 |
| 1.20 | 14 | 14 | 16 |
| 1.00 | 16 | 16 | 18 |
| 0.853 | 18 | 20 | 20 |
| 0.710 | 22 | 24 | 25 |
| 0.599 | 25 | 28 | 30 |
| 0.500 | 30 | 32 | 35 |
| 0.422 | 36 | 35 | 40 |
| 0.354 | 44 | 42 | 45 |
| 0.297 | 52 | 48 | 50 |
| 0.251 | 60 | 60 | 60 |
| 0.211 | 72 | 65 | 70 |
| 0.178 | 85 | 80 | 80 |
| 0.152 | 100 | 100 | 100 |
| 0.125 | 120 | 115 | 120 |
| 0.104 | 150 | 150 | 140 |
| 0.089 | 170 | 170 | 170 |
| 0.075 | 200 | 200 | 200 |
| 0.066 | 240 | 250 | 230 |
| 0.053 | 300 | 270 | 270 |
| 0.044 | 350 | 325 | 325 |
| 0.037 | 440 | 400 | 400 |

In addition to standard U.S. and Tyler mesh sizes, commercial sieves in the U.S. can also utilize three other standards.

Rubber which meets the (ASTM) standards for a wider variety of products (e.g., such as off-road tires, automotive, consumer products) can be sold at a higher price. Specific materials standards apply to various types of products. Rubber that does not meet the standard for high-quality uses is sold for less. For example, rubber which meets higher ASTM standards may sell for as much as twelve times the cost of lower quality rubber (e.g., asphalt, fuel grade or aggregate quality rubber).

Generally, using current processes, the higher the rubber recovery rate the more metal contaminants the rubber will have. For example, a process which scrapes rubber and avoids contact with the metal tire treads will be reasonably free of metal contaminants, but will have a relatively low recovery rate. A more efficient tire stripping method will recover a greater percentage of rubber, but the rubber will include more iron oxide and metal contaminants.

A similar problem exists with regard to steel recovered in the process. Generally, steel recycling ("smelting") requires recovered steel which has less than 5% rubber (by volume) adhered to the steel. With current tire recycling processes, the higher recovery rates usually result in increased levels of rubber contaminants.

It is desirable to have a single integrated machine and/or system to reduce the number of steps and processes necessary to reduce rubber to crumb rubber.

It is further desirable to increase the quantity of rubber and steel that can be recovered from each used tire.

It is further desirable to increase quality of rubber and steel recovered from used tires consistent with ASTM standards because recovered material has an increased value and can be used for a wider range of purposes.

It is further desirable to extend the mechanical life of equipment currently used to recover rubber, steel and fiber from used tires.

It is further desirable to integrate the de-vulcanization and re-vulcanization processes with tire recycling and recovery processes.

It is further desirable to reduce the operating costs of tire recycling operations.

SUMMARY OF THE INVENTION

The present invention is a Micro-erosion Recovery System for separating recyclable tire materials (rubber, steel and fiber) and complying with quality standards governing the use of recovered tire materials. It is also a highly efficient apparatus and system for producing large amounts of high quality crumb rubber and steel. The system is controlled by selecting a micro erosion water jet nozzle with a specific cross-sectional area of the inlet and continually taking measurements of the inlet pressure until ideal mesh size of crumb rubber is met. Using the inlet pressure and cross-sectional area of the inlet, the remaining variables are able to be calculated by using an equation known in the art.

DETAILED DESCRIPTION OF INVENTION

For the purpose of promoting an understanding of the present invention, references are made in the text to exemplary embodiments of a micro-erosion recovery system (MERS) for tire materials, only some of which are described herein. It should be understood that no limitations on the scope of the invention are intended by describing these exemplary embodiments. One of ordinary skill in the art will readily appreciate that alternate but functionally equivalent micro-erosion recovery systems (MERS) for tire materials may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates a configuration of exemplary MERS system 100 comprised of four operating platforms (modules): (1) The Operations Control Center module, (2) the Micro-Erosion Recovery System (MERS) module, (3) the Pre-MERS module, and (4) the Post-MERS module.

The Operations Control Center module consists of the following major components: (1) the I/O Processor 999 (2) sensors, signals and activators, (3) motors control panel, power control panel, and any other operating controls.

In the embodiment shown, all program logic will be held on EPROM and under security lock within the I/O processor 999 and if tampered with the system will dump all programs and system will shut down.

The Pre-MERS Platform component consists of the following major components: (1) waste tire conveyance systems, (2) a tire washing unit with water treatment and reuse, (3) operating control devices, and (4) sidewall cutting and tread cutting unit.

In the embodiment shown, waste tires 2 are individually delivered to the System at the rate of three tires per minute, first to the tire wash system, then the in-line weigh scale, then to the sidewall separation and tread cutting unit, and then to the MERS module.

In various embodiments, tire washing may be accomplished using an apparatus that automatically picks up tire 2 and delivers it through the tire wash unit in such a manner as to allow the entire tire 2 to be washed. The tire wash unit is a fully automated pressure wash system with multiple, pressurized water jet heads, strategically positioned to clean the entire tire, including the interior of the tire of grit and debris. The water/debris will be collected and pumped to an automated, self cleaning filter, which will remove all of the debris to a four micron level and return the cleaned water back to the pressure wash pump. The debris will collect in the filter to the point that it is automatically discharged, as determined by a predetermined pressure gauge. The discharged debris will require disposal. The tire delivery apparatus will then drop each tire 2 onto a flat conveyor for conveyance to the weigh scale.

In various embodiments, the in-line weigh scale will tabulate the weight of each tire 2 and maintain a running total of tires 2 processed and the accumulative weight. This data will be automatically collected by the I/O processor 999 that will maintain a permanent record. Tire 2 that does not meet minimum weight specifications could be programmed to be rejected.

The MERS Platform consists of the following major components: (1) the Ultra-High Water Pressure Water Jet System (UHPWJS), (2) the UHPWJS processing platform, (3) the water/crumb rubber collection and separation system, and (4) the processing water treatment and reuse system.

Figure 4:
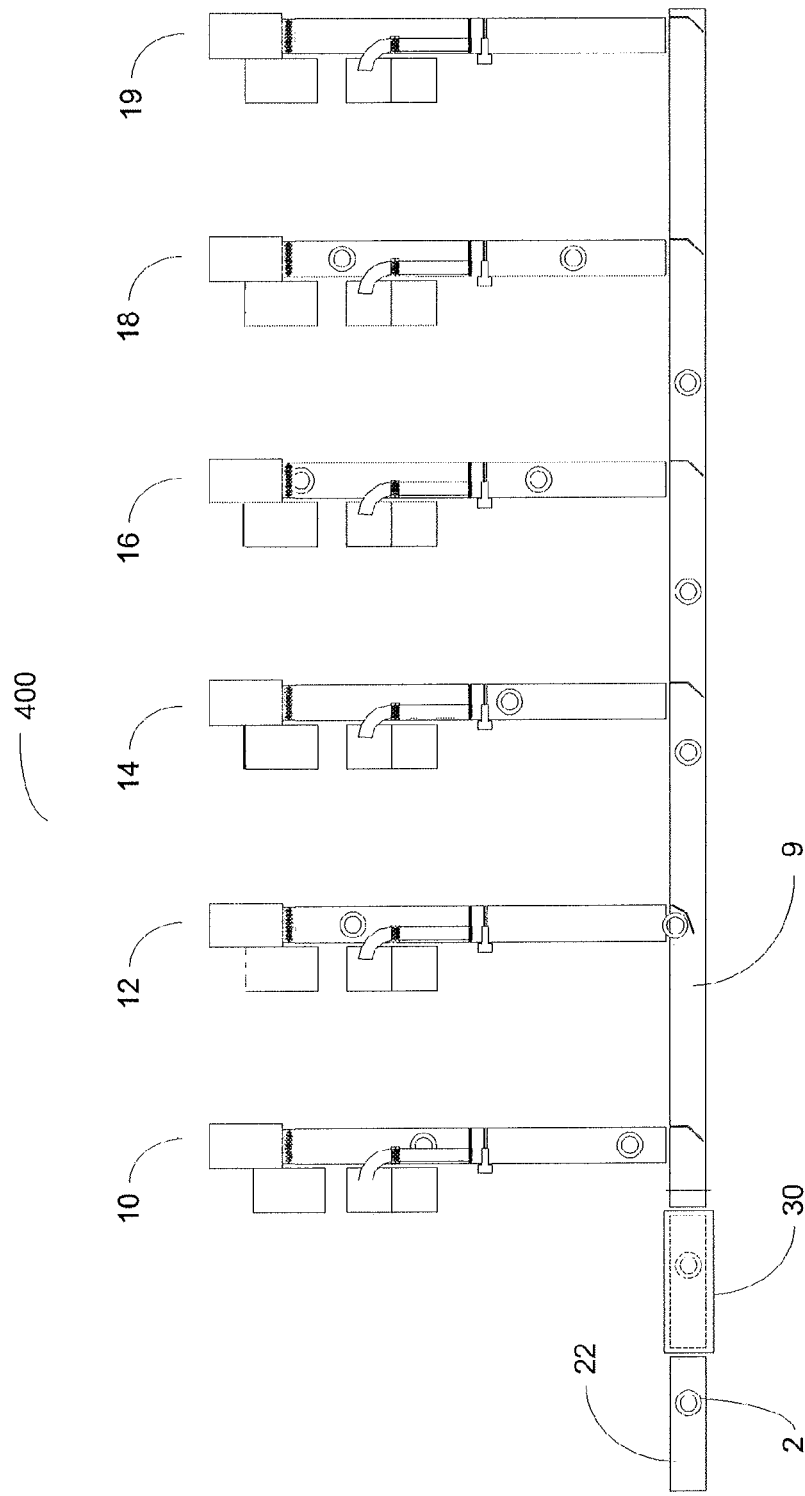
FIG. 4 illustrates a perspective view of an exemplary configuration of a multi-line micro-erosion recovery (MERS) system for tire materials.

FIG. 4 is an exemplary embodiment of multi-line MERS system 100 comprised of MERS units 10, 12, 14, 16, 18 and 19. In the embodiment shown, six MERS units are shown, five of which operate simultaneously and one line is redundant (back up) line to prevent operational downtime in the event of mechanical failure and maintenance. Other systems may have more or fewer or differently configured MERS lines. In the embodiment shown, MERS units 10, 12, 14, 16, 18 and 19 are positioned in a linear configuration. In alternative embodiments, MERS units 10, 12, 14, 16, 18 and 19 may be configured in a lateral stacked configuration, circular configuration semi-circular configuration, I-shaped configuration, angular configuration or any other configuration necessary to accommodate the space constraints of a building.

In the embodiment shown, tire 2 is loaded into conveyer entry point 22, and loading may be accomplished using a variety of methods and apparatus configurations. For example, tires may be loaded onto conveyor entry point 22 with a stationary or movable rod or belt (not shown) extending through the tires' central holes. In another example, tires can be stacked for processing on stationary or movable table, rack, belt, etc.

Tires may be car, truck, tractor, semitractor, transport, airplane tires, off-road tires, machinery tires, monster tires or any other tire known in the art which is constructed of rubber, steel, fiber, Kevlar™ and functionally equivalent materials. MERS units 10, 12, 14, 16, 18 and 19 can recover any of the foregoing materials.

Tire 2 (from which the rim has been removed) passes through wash station housing 30 which encases a series of water spray nozzles (not shown) known in the art which are used to clean and remove debris from tires 2. Tires 2 are moved along conveyer belt which is any type of conveyer apparatus or functionally equivalent device known in the art.

Tire 2 further includes sidewalls and treads, which may consist of rubber, fiber, steel, Kevlar™. As illustrated in FIG. 1, MERS system is configured with a plurality of tire position sensors 815, 815 that sense the position of each tire 2 along conveyer 9 and send an electronic signal (hardwired or wireless via a local or distributed network) to I/O processor 999.

I/O processor 999 may monitor the functioning of the system, the quantity of tires processed, the amount of material recovered and all discrete and analog signals. I/O processor 999 may generate reports related to MERS processing, may be programmed with revenue processing and inventory control capabilities or other functionality.

I/O processor 999 is configured with software and program logic which interprets the multiple signals sent by tire position motion sensors to communicate the position of the tires along the conveyer with a plurality of first robotic sweeping arms 50a, 50b which sequentially divert tires 2 into processing channels 5a, 5b.

In the embodiment shown, robotic sweeping arms 50a, 50b (shown in FIG. 1) and robotic grasping arms 53a, 53b use servo motors known in the art or any functionally equivalent motor adapted to control robotic components using electronic signal. In the embodiment shown, robotic grasping arms 53a and 53b include robotically controlled brackets or pads which exert counter pressure to lift tires 2.

Figure 5:
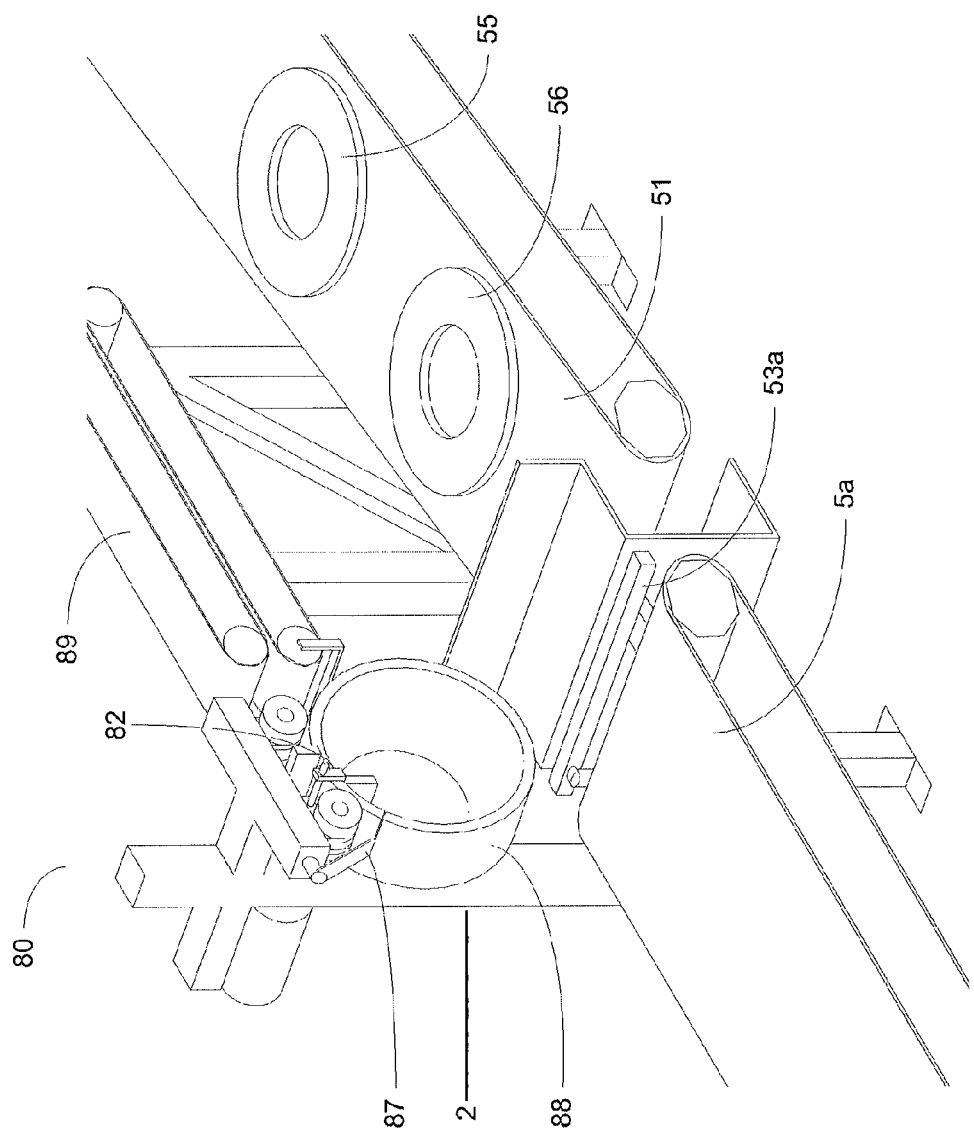
FIG. 5 illustrates a perspective view of an exemplary embodiment of a sidewall cutting assembly of a MERS unit.

FIG. 5 illustrates an exemplary embodiment of a tire 2 being grasped by robotic grasping arm 53a in a substantially upright position after tire 2 has been directed into channel 5a. Robotic grasping arm 53a has the capability of movement in up to six non-linear axis to enable sidewall cutting implement 82 to cut the sidewalls off tire 2. Sidewalls 51 fall onto lower conveyor 51 and are moved toward sidewall processing station shown in FIG. 10.

In various embodiments, MERS system 100 may utilize high-precision robotic positioning systems for use in a wide variety of applications. For example, MERS robotic arms may be based on various robotic systems known in the art offering high load capacity and range of movement while maintaining a high degree of precision and repeatability.

FIG. 5 further illustrates sidewall cutting assembly 80, which includes sidewall cutting implement 82. In various embodiments, sidewall cutting implement 82 may be a laser jet, water jet, blade or knife positioned to remove sidewall. The movement of sidewall cutting implement 82 may be controlled by robotic or other simple mechanical means.

Figure 7:
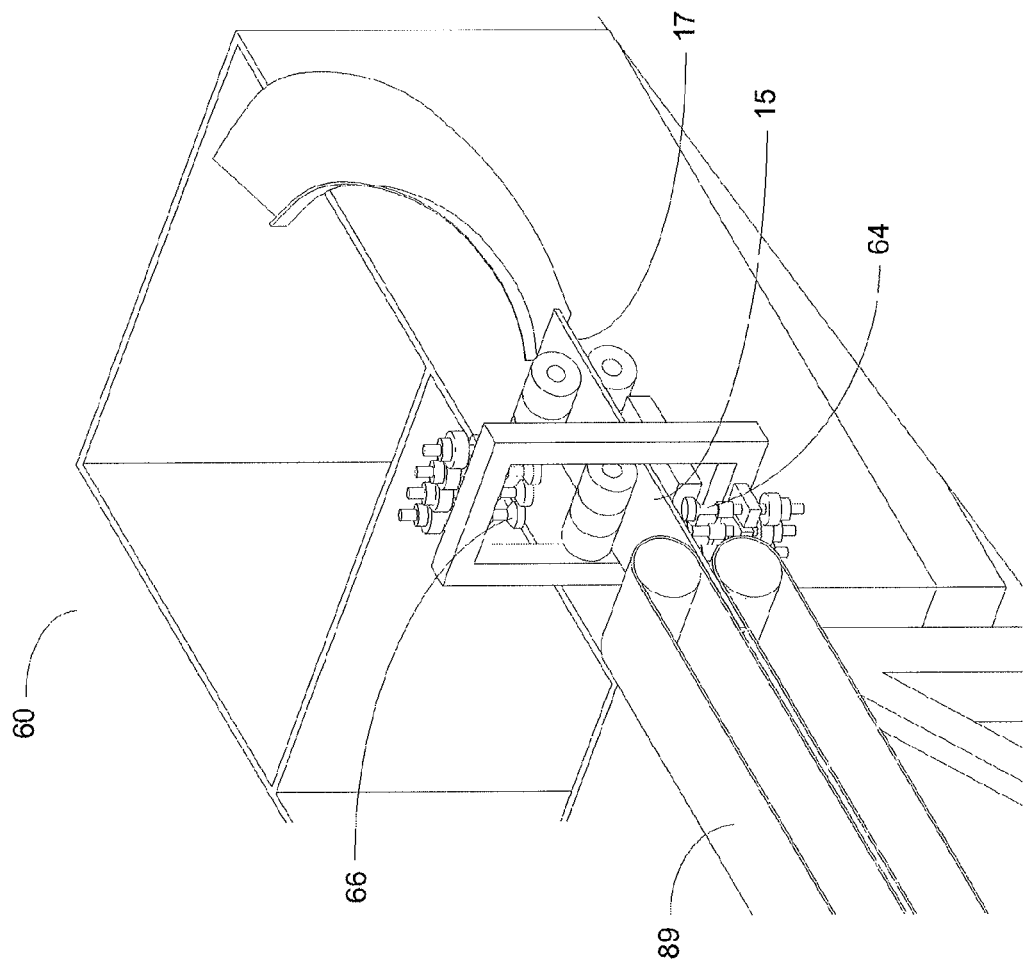
FIG. 7 illustrates a perspective view of an exemplary embodiment of a tread processing station of a MERS unit.

Sidewall cutting assembly further includes tread cutting implement 87 which slits the tread (which is comprised of rubber, and fiber) so that the tread portion 88 can be stretched into a single linear configuration which is fed into roller assembly 89 where tread portion 88 is stretched flat between two conveyors and moved toward tread processing station 60 (shown in FIG. 7). Sidewalls 55 and 56 drop onto sidewall conveyer 59 and are conveyed or otherwise moved toward sidewall processing station 70 (shown in FIG. 10).

Figure 6:
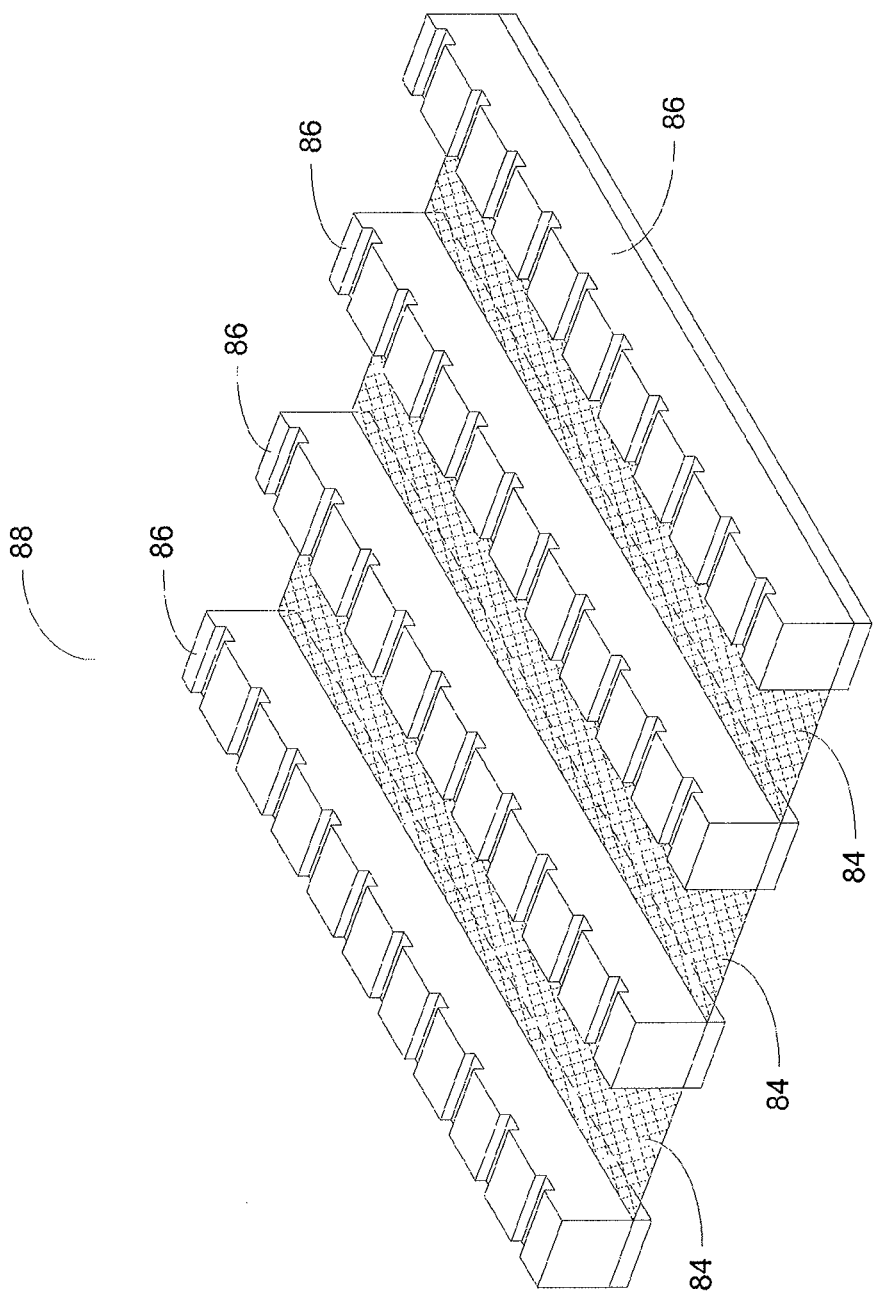
FIG. 6 illustrates a perspective view of a partial, flattened tire tread.

FIG. 6 illustrates a top view of tread portion 88, having rubber portions 86 and steel portions 84, of which tread portion 88 is comprised.

FIG. 7 illustrates an exemplary embodiment of an MERS tread processing station 60. Tread processing station includes a series of underside water jets 64 which are directed to the underside of the tread and a series of topside water jets 66 which are directed to the topside of the tread.

When activated, underside water jet 64 and topside water jet 66 direct a stream of water at a high speed and pressure over the topside tread surface 16 and underside tread surface 17.

Because of the speed/pressure and flow rate of the water, a multitude of tiny cracks or cavities are progressively formed in the surface of the rubber, causing the rubber surface to separate into a fine mesh powder ("pulverized"). This process is known in the art as micro-erosion.

The size of the particles is referred to as "mesh size." The mesh size of the particles in the exemplary embodiment shown may range from 400 mesh to in excess of 1 mesh on the Tyler mesh scale. (Other mesh scales may be applied).

In the embodiment shown, the mesh size of the particles processed by jets 64, 66 is 1-400 mesh, as defined by the Tyler mesh scale.

Water jets 64, 66 have a psi of 2,000 to 200,000. The angle of the nozzle relative to the tread enables changing of mesh size based on the angle of the nozzle relative to the tire and the distance the nozzle is from the tire.

In the embodiment shown, the mesh size of the particles after exposure to the water stream from jets 64, 66 is determined by three variables: the angle of nozzle (nozzle position), the distance of the water jet nozzle ("distance") relative to tread and the psi of water jets 64, 66. Nozzle position, distance and psi can be independently varied, or may be adjusted in combination to yield an optimum crumb rubber mesh size.

As the distance of the nozzle increases relative to the tread, if nozzle position and psi remain constant, the mesh size of the particle will generally increase.

As the pressure increases, assuming position and distance remain constant, mesh size of the crumb rubber particles will generally decrease.

Nozzle position, distance and psi can be independently varied or varied in combination to affect the speed of process ("through put").

As crumb rubber is produced by MERS tread processing station 60, it is moved by conveyor to receptacle or repository for packaging. Crumb rubber and water produced during the water jet process may be collected using any apparatus or method known in the art such as screening, multiple screening, filtration, sodium zeolite softening, Ph adjustment, total hardness adjustment and chloride control. Separation may also be accomplished by electrical or mechanical means such as air blowing, sonic and ultrasonic field separation and centrifuges.

Figure 8:
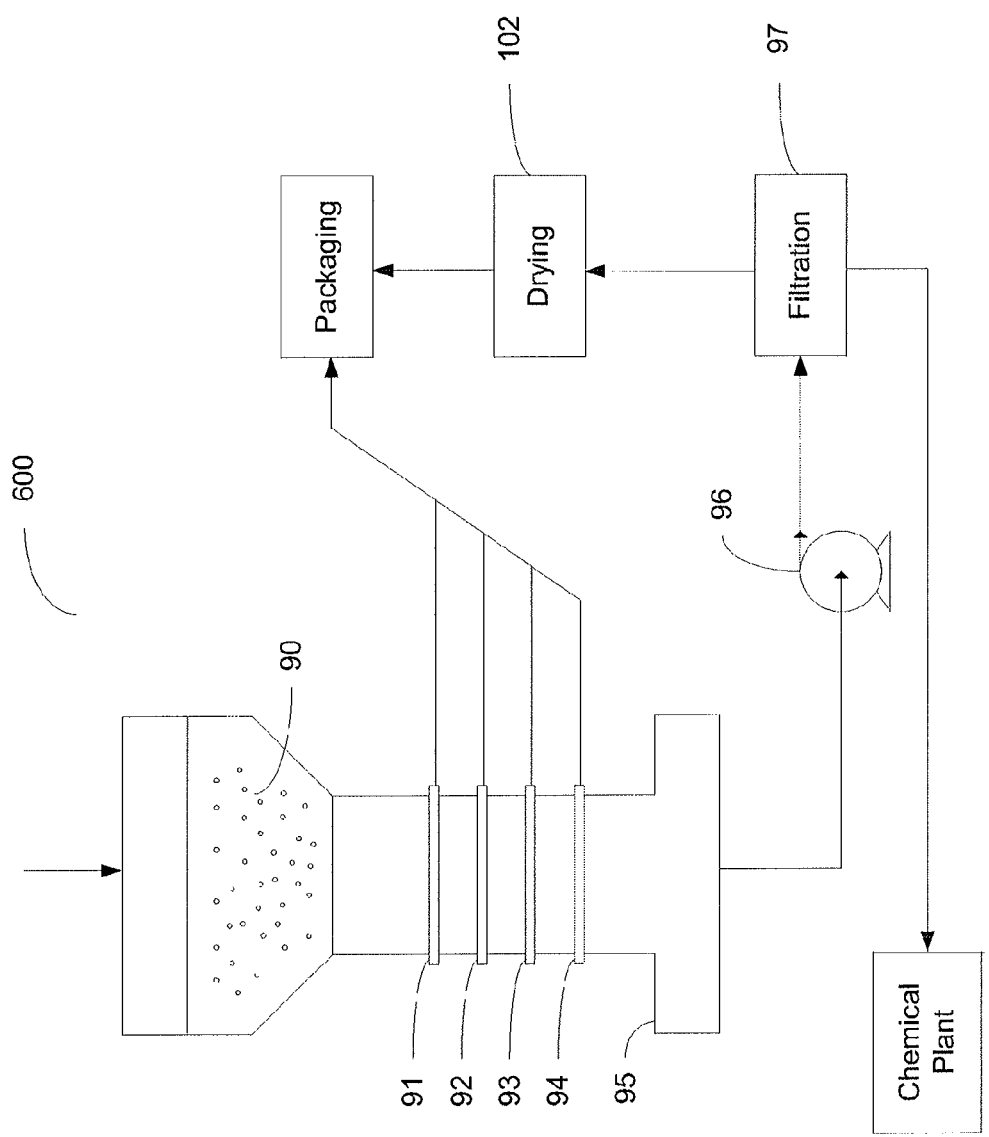
FIG. 8 illustrates an exemplary embodiment of a crumb processing assembly.

FIG. 8 illustrates an exemplary crumb processing assembly 600 for crumb rubber collection, water filtration and treatment. In the embodiment shown, water and crumb rubber particles fall downward from tread processing station 60 (shown in FIG. 5) and passes through a series of mesh screens 91, 92, 93, 94 where the crumb rubber is collected and removed from the screens. Water from the jet cutting process described infra is collected in holding tank (sump) 95 to retrieve additional crumb rubber particles pumped using pump 96 and for reuse in the process. The additional crumb rubber particles retrieved from filtering are dried using drying apparatus 102 which is an air blowing or heat apparatus known in the art. In various embodiments, drying apparatus may also use other processes known in the art such as air blowing, sonic and ultrasonic field separation and centrifuges. Filtered and screened crumb rubber particles may then be transported and/or packaged for use, and will generally meet high market value ASTM standards.

Figure 9:
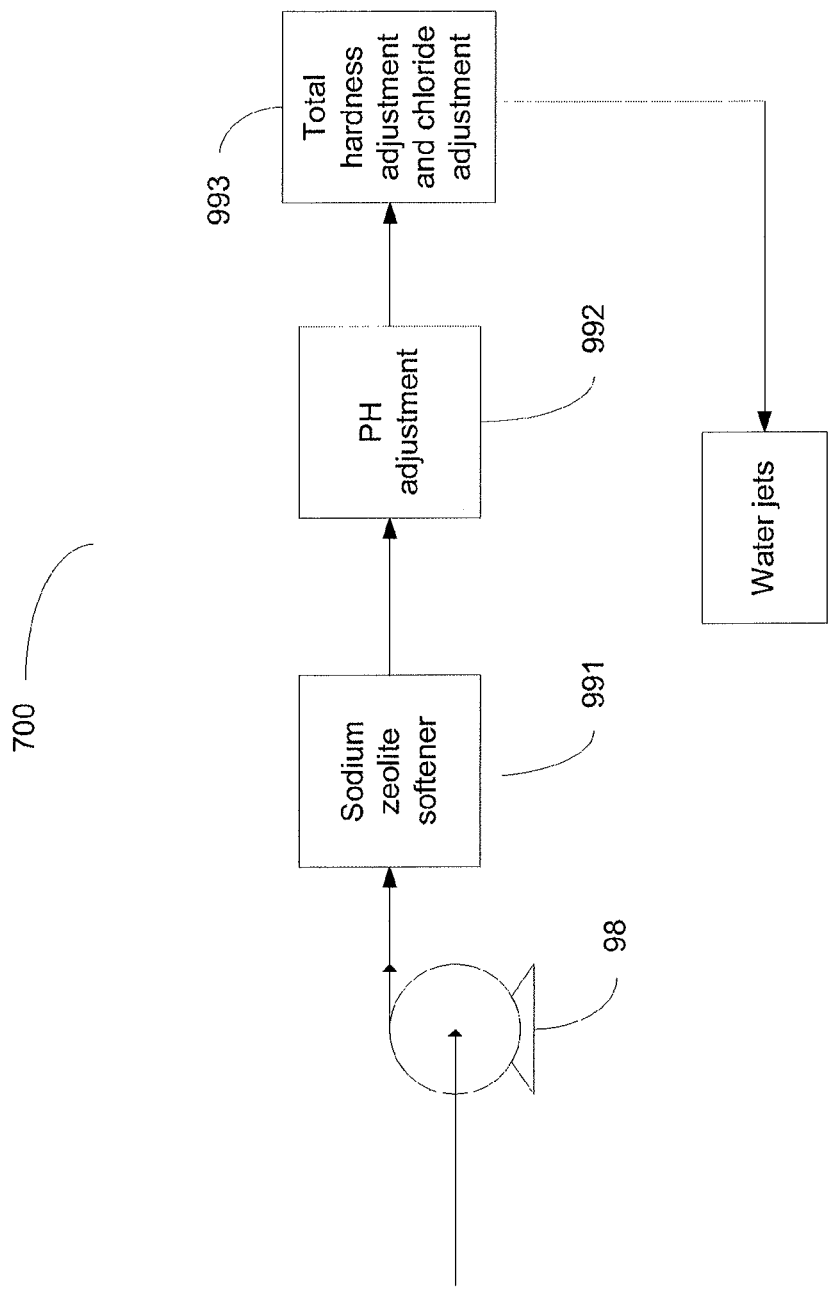
FIG. 9 illustrates an exemplary embodiment of a water chemical treatment system.

FIG. 9 illustrates exemplary water chemical treatment station 700. In the embodiment shown, water is pumped through pump 98, passes through sodium zeolite softening processor 991, Ph adjustment processor 992, total hardness adjustment and chloride adjustment processing 993.

Figure 10:
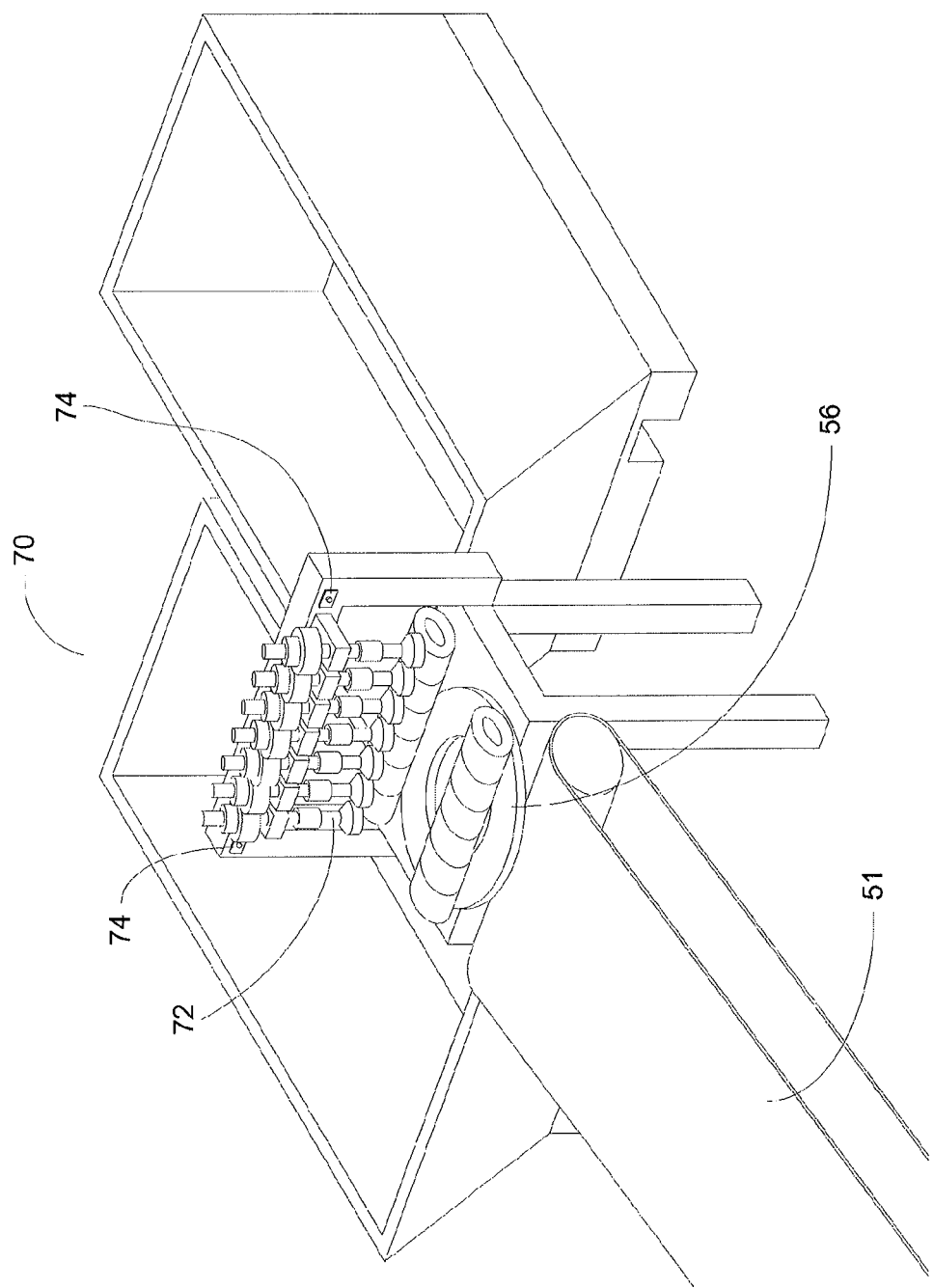
FIG. 10 illustrates an exemplary embodiment of a sidewall processing station of a MERS system.

FIG. 10 illustrates an exemplary embodiment of a MERS sidewall processing station 70.

Sidewall processing station 70 includes a series of water jets 72 that are directed to sidewall 56 and pulverize the rubber component, stripping the steel bead (not shown) clean using the process described in FIGS. 7, 8, and 9.

In various embodiments, ultra high pressure water is produced by a patented "water jet intensifier pump system" (a single piston, dual plunger, reciprocating intensifier unit) and a 200 HP pump that provides a consistent stream of water at a designated pressure from 50000 to 90000 psi. Typically, multiple pumps will operate in parallel. The pump used will be a pump commerically available such as the ultra high water pressure cutting system manufactured by Jet Edge. Blue Diamond Technologies has the exclusive right to utilize the ultra high water pressure cutting system as manufactured by Jet Edge. The Jet Edge system utilizes patented, proprietary "Intensifier" pumps" as opposed to "direct drive" pumps that are used by competitive waterjet systems. The major difference is a direct-drive style pump uses a crank to drive the pump's plunger, while an intensifier uses a hydraulic cylinder to drive the plunger. Intensifier pumps last longer and are less-expensive to maintain and use at least 30% less energy than direct-drive pumps.

In an exemplary embodiment, the single line Hangzhou facility will integrate six single piston, dual plunger, reciprocating intensifiers and six 200 HP pumps. The entire system will utilize 24 GPM of process water.

In various embodiments, the UHPWJS platform includes: (1) tread micro erosion device, (2) sidewall micro erosion device, (3) process water and crumb rubber collection and separation, (4) process water treatment and reuse, and (5) steel collection and bailing.

In an exemplary embodiment, tread micro erosion is where the tread leaves the sidewall cutting platform and is automatically delivered to the micro erosion station where it is fed into a motorized compression roller apparatus that passes the tread through the water jet nozzles that deliver and direct the multiple streams of ultra high pressure water that produce the micro erosion.

In an exemplary embodiment, the sidewall micro erosion station includes a series of robotically controlled water jets that are directed to the sidewall and pulverize the rubber component, stripping the steel bead clean. The sidewall micro erosion station is controlled by the same type sensors that control the tread micro erosion system.

In an exemplary embodiment, the water/crumb rubber collection and separation system is where the micro erosion units are processing tire 2 and the water and crumb will be collected and will be directed through an automatic, self cleaning strainer. This unit assures continuous flow, simplified maintenance and worry-free operation and will remove all crumb particles remaining in the water. The removed crumb may be delivered to the dryer by a screw auger.

In an exemplary embodiment, the processing water treatment and reuse system is where the clean water will come from the strainer and then will pass through a reverse osmosis membrane that treats all water prior to entering the ultra high water jet system and then into a holding tank for use in the micro erosion system. There will be a small amount of discharge water from the reverse osmosis unit that must be disposed of (typically it would drain to a sewage line).

All new micro erosion processing water will be treated to meet the specifications of the micro erosion water system. Treatment will principally consist of: a water softening unit that will remove calcium and magnesium, a reverse osmosis unit that will remove virtually all dissolved minerals and organisms, and an activated carbon filter that polishes the water.

In an exemplary embodiment, in the steel collection and bailing, the steel in the tread and the sidewall are virtually unaffected by the micro erosion of the crumb rubber, but yet the steel exits the system free of any rubber material. Upon completion of micro erosion of the rubber the steel will be conveyed to a surge bin that will feed a bailer unit that will compress the steel into bails of a customer prescribed weight.

The Post-MERS Platform consisting of the following major components: (1) crumb rubber dryer system, (2) crumb rubber size classification units, (3) a pulverization mill, (4) crumb rubber and fibre separation units, (4) crumb rubber bagging and steel and fibre bailing units and (5) numerous conveyance systems and surge bins.

As illustrated in FIG. 1, MERS system 100 is configured with a plurality of tire location sensors 815 that sense the position of each tire 2 along conveyer belt 9 and send an electronic signal (hardwired or wireless via a local or distributed network) to I/O processor 999.

I/O processor 999 may monitor the functioning of the system, the quantity of tires processed, the amount of material recovered and all discrete and analog signals. I/O processor 999 may generate reports related to MERS processing, may be programmed with revenue processing and inventory control capabilities or other functionality.

I/O processor 999 is configured with software and program logic which interprets the multiple signals sent by tire location sensors 815 to communicate the location of the tires along the conveyer with a plurality of first robotic sweeping arms 50*a*, 50*b* which sequentially divert tires 2 into processing channels 5*a*, 5*b*.

In the embodiment shown, robotic sweeping arms 50*a*, 50*b* and robotic grasping arms 53*a*, 53*b* use servo motors known in the art or any functionally equivalent motor adapted to control robotic components using electronic signal. In the embodiment shown, robotic grasping arms 53*a* and 53*b* include robotically controlled brackets or pads which exert counter pressure to lift tires 2.

Figure 2:
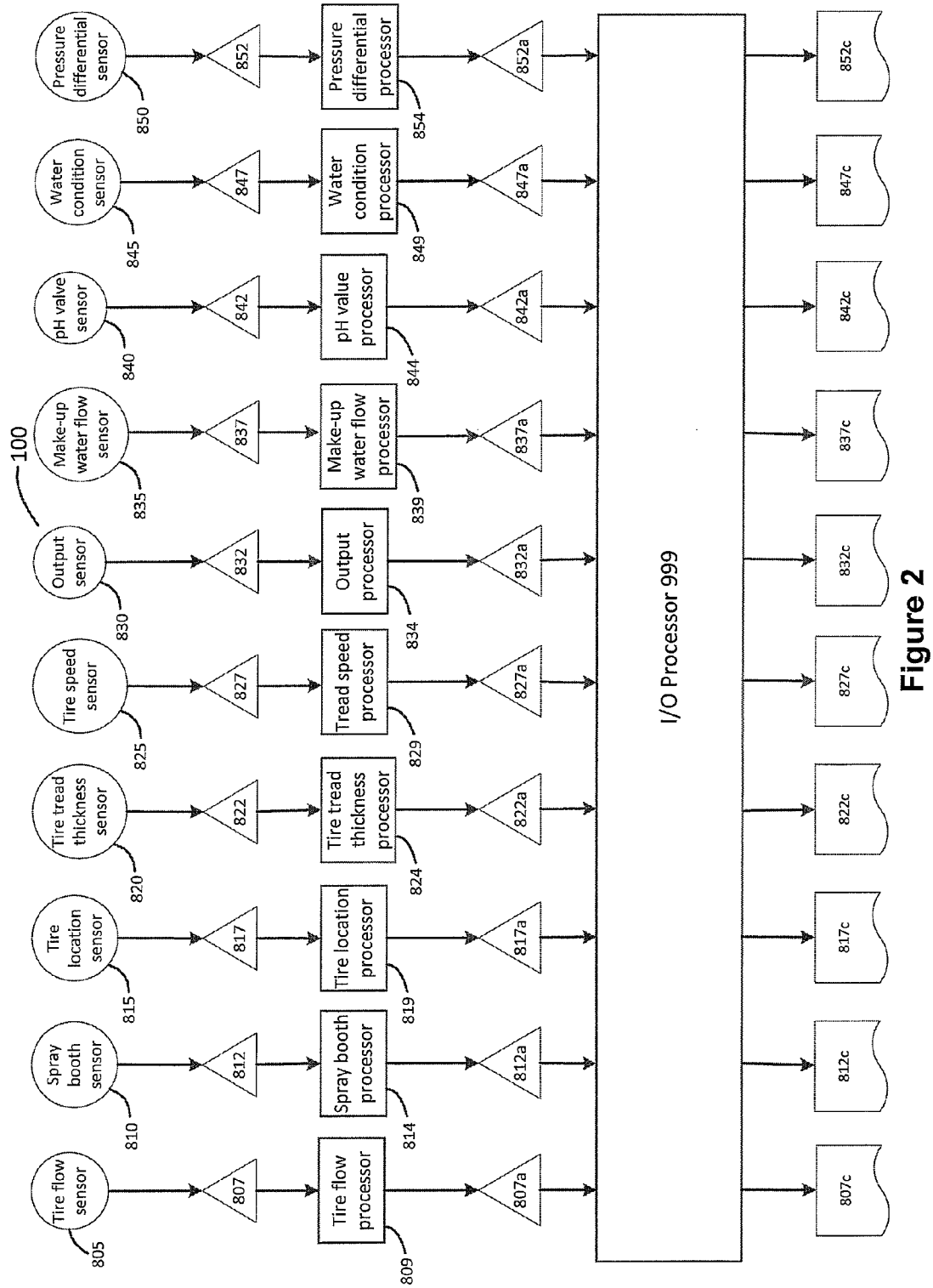
FIG. 2 illustrates a system diagram for an exemplary MERS system.

FIG. 2 illustrates a system diagram for exemplary MERS system 100, specifically depicting a novel and critical configuration of FIG. 1. In the embodiment shown, MERS system 100 includes I/O processor 999, sensors 805, 810, 815, 820, 825, 830, 835, 840, 845, and 850, processors 809, 814, 819, 824, 829, 834, 839, 844, 849, and 854, various data structures 807, 812, 817, 822, 827, 832, 837, 842, 847, and 852, updated data structures 807*a*, 812*a*, 817*a*, 822*a*, 827*a*, 832*a*, 837*a*, 842*a*, 847*a* and 852*a*, and software objects 807*c*, 812*c*, 817*c*, 822*c*, 827*c*, 832*c*, 837*c*, 842*c*, 847*c*, and 852*c*.

In the embodiment shown, tire flow sensor 805 measures the flow of waste tires as they travel along the conveyor for processing. In this exemplary embodiment, tire flow sensor 805 is a unidirectional optical photo cell that is mounted on the horizontal waste tire conveyor. As a tire passes by, tire flow sensor 805 senses the speed of a bounce back signal to distinguish steel from rubber as a result of a change in the density. Tire flow sensor 805 is calibrated within the range of that of the density of the tire. When the signal ranged is reached, tire flow sensor 805 will increment. The space between each tire acts as a switch as the bounce back signal changes out of range of a tire. As the next tire passes by tire flow sensor 805, the bounce back signal changes to the calibration range of a tire and counts two. This is repeatable in continual operation. The sensed data that tire flow sensor 805 senses is tire flow data structure 807 and is converted to binary data by a signal convertor (not shown) which allows the sensed data in tire flow data structure 807 to be read by I/O processor 999.

The signal conditioner (not shown) receives tire flow data structure 807 from tire flow sensor 805 and converts it to binary data in the form of binary data structure (not shown). In the embodiment shown, tire flow data processor 809 receives binary data structure from signal conditioner and changes sensed data in tire flow data structure 807 to a format I/O processor 999 can read. Tire flow data processor 809 maintains a real time count of the tires. Tire flow data processor 809 creates updated tire flow data structure 807*a* which includes tire passage data signals. Updated tire flow data structure 807*a* stores the tire count. I/O processor 999 pulls data from updated tire flow data structure 807*a* and creates a control object. Tire component control object 807*c* produced by I/O processor 999 includes data and functions from the I/O processor 999 to execute commands and control systems components.

Spray booth sensor 810 senses when the tire is in the washing station. In this exemplary embodiment, spray booth sensor 810 is a rotary switch which is mounted within the spray booth on the horizontal conveyor side mount. As the tire passes by spray booth sensor 810, the movement of the tire moves spray booth sensor 810 in a clock-wise direction creating spray booth tire position structure 812. Spray booth tire position structure 812 is a 0 v or 10 v signal indicating, no or yes, that either there isn't a tire in position or that a tire is in position and is ready to wash. The signal conditioner (not shown) receives spray booth tire position data structure 812 from spray booth sensor 810 and converts it to binary data in the form of binary data structure (not shown). Spray booth data processor 814 receives binary data structure from signal conditioner and changes sensed data in spray booth tire position data structure 812 to a format I/O processor 999 can read. Spray booth data processor 814 creates a value of 0 or 10 which again reflects that there is a tire in position to be washed. Spray booth data processor 814 creates updated spray booth tire position data structure 812*a* which includes tire position data signals. Updated spray booth tire position data structure 812*a* stores the sensed data of 0 or 10. I/O processor 999 pulls data from updated spray booth tire position data structure 812*a* and creates a control object. Valve component control object 812*c* produced by I/O processor 999 includes data and functions from the I/O processor 999 to execute commands and control systems components.

In this exemplary embodiment, valve component control object 812*c* applies a voltage to the spray wash water supply valve on/off solenoid valve (normally closed) to open solenoid valve to apply water pressure to the tire for cleaning purposes. The length of time for valve component control object 812*c* to hold the solenoid valve open for cleaning is predetermined by the program logic of I/O processor 999 based on the speed of the conveyor. After the predetermined time is reached, I/O processor 999 takes power off the solenoid valve and it closes by spring action to its normally closed position and the process repeats itself for the next tire.

In the embodiment shown, tire location sensors 815 are located at the processing spray nozzles for the tread processing, sidewall processing stations, and the sidewall cutting station. Tire location sensors 815 are brass housing with LED status indication. In one exemplary embodiment, tire location sensor 815 may be located at the tread processing station. Considering the operating function of the tread processing station, the deviation in the diameter of each tire, once the sidewall is cut-out and the tread is then cut once and stretched out and feed into the rollers for spray nozzle processing, will have different widths from one tire to the other. Tire location sensor 815 senses where the surface of the tread is located via 10 to 30 VDC signal as they travel along the conveyor for processing, and this data is stored in data structure 817 and is converted to binary data by a signal convertor (not shown) which allows the sensed data in tire location data structure 817 to be read by I/O processor 999.

In the embodiment shown, tire location data processor 819 receives binary data structure from signal conditioner and changes sensed data in tire location data structure 817 to a format I/O processor 999 can read. Tire location data processor 819 creates updated tire location data structure 817*a* which includes tire location data signals. Updated tire location data structure 817*a* stores the tire location. I/O processor 999 pulls data from updated tire location data structure 817*a* and creates a control object. Location component control object 817*c* produced by I/O processor 999 includes data and functions from the I/O processor 999 to execute commands and control systems components. In this exemplary embodiment, location component control object 817*c* sends a signal to the spray nozzles in the direction to cover the full range of the tread surface.

In another exemplary embodiment, tire location sensor 815 may be located at the side wall processing station. The tire location sensor 815 works the same way, however, it is sensing the diameter of the sidewalls.

In still another exemplary embodiment, tire location sensor 815 may be located at the side wall cutting station. Tire location sensor 815 senses the location of a point on the tire side so that a robotic controller can grasp it and lift the tire into place for processing.

In the embodiment shown, tire tread thickness sensor 820 determines the thickness of the tread so the information can be used to determine the correct tread speed necessary to remove the rubber from the steel while not cutting the steel itself. In this exemplary embodiment, tire tread thickness sensor 820 is a laser beam projected and is reflected from a target surface to a collection lens. This lens is typically located adjacent to the laser emitter. The lens focuses an image of the spot on a linear array camera (CMOS array). The camera views the measurement range from an angle that varies from 45-65 degrees at the center of the measurement range. The position of the spot image on the pixels of the camera is then determined as the distance tire is to tire tread thickness sensor 820. This sensed data is tire tread thickness data structure 822. The signal conditioner (not shown) receives tire tread thickness data structure 822 from tire tread thickness sensor 820 and converts it to binary data in the form of binary data structure (not shown). Tire tread thickness data processor 824 receives binary data structure from signal conditioner and changes sensed data in tire tread thickness data structure 822 to a format I/O processor 999 can read.

Tire tread thickness data processor 824 creates updated tire tread thickness data structure 822*a* which includes the thickness of the tread. Updated tire tread thickness data structure 822*a* stores the tread thickness measurements. I/O processor 999 pulls data from updated tire tread thickness data structure 822*a* and creates a control object. Tread thickness component control object 822*c* produced by I/O processor 999 includes data and functions from the I/O processor 999 to execute commands and control systems components. I/O processor 999 predetermines the linear speed of the incoming tread relative to the spray processing nozzles to pulverize the rubber from the tread leaving the steel belt within the tread in tacked intact. At the pressures, velocities, angle, and flow rate of the spray nozzles the tolerance between stripping the rubber and not disturbing the steel belts is lower in sensitivity then the accuracy of the feedback control loop from tire tread thickness sensor 820.

In the embodiment shown, tread speed sensor 825 is a visible laser which determines the current speed at which the tread is being fed into the UHPWJ. As tread passes by, tread speed sensor 825 senses this movement and sends a signal to tread speed data processor 829. This sensed data is tread speed data structure 827. The signal conditioner (not shown) receives tread speed data structure 827 from tread speed sensor 825 and converts it to binary data in the form of binary data structure (not shown). Tread speed data processor 829 receives binary data structure from signal conditioner and changes sensed data in tread speed data structure 827 to a format I/O processor 999 can read.

Tread speed data processor 829 takes sensed data from tread speed data structure 827 converts it to speed in distance per unit time. Tread speed data processor 829 creates updated tread speed data structure 827*a* which includes the tread speed. Updated tread speed data structure 827*a* stores the tread speed. I/O processor 999 pulls data from updated tread speed data structure 827*a* and creates a control object. Tread speed component control object 827*c* produced by I/O processor 999 includes data and functions from the I/O processor 999 to execute commands and control systems components.

In this exemplary embodiment, tread speed component control object 827c includes the increase/decrease required based on the feedback signal from tread speed sensor 825. Depending on the present speed of the tread being processed, I/O processor 999 will apply the corresponding pre-programmed speed for the incoming tread based on the new thickness of the incoming tread. This changes the hertz's frequency signal to the variable speed drive motor that controls the speed of the compression rollers which house the tread and speed.

In the embodiment shown, output sensor 830 measures the weight of the crumb rubber and steel bins. Output sensor 830 is a load cell and can either be a sensor for the crumb rubber bins or the steel bins. An automatic guided vehicle picks up the crumb rubber bins that collected crumb from the process line conveyor, which rests on output sensor 830 and the weight of the bin is sensed by using a density measurement. This process is the same for the steel bins. The sensed data that output sensor 830 senses is output data structure 832 and is converted to binary data by a signal convertor (not shown) which allows the sensed data in output data structure 832 to be read by I/O processor 999.

In the embodiment shown, output data processor 834 receives binary data structure from signal conditioner and changes sensed data in output data structure 832 to a format I/O processor 999 can read. Output data processor 834 creates updated output data structure 832a which includes weight data information. Updated output data structure 832a stores the weight information. I/O processor 999 pulls data from updated output data structure 832a and creates a control object. Plant output component control object 832c produced by I/O processor 999 includes data and functions from the I/O processor 999 to execute commands and control systems components. In this exemplary embodiment, plant output component control object 832c trends and logs the amount of product per unit time.

In the embodiment shown, make-up water flow sensor 835 monitors water loss due to evaporation from UHPWJ water recycling system. Make-up water flow sensor 835 is an electromagnetic flow meter that measures conductivity and creates it to 4-20 milliamps. The sensed data that make-up water flow sensor 835 senses is make-up water flow data structure 837 and is converted to binary data by a signal convertor (not shown) which allows the sensed data in make-up water flow data structure 837 to be read by I/O processor 999.

In the embodiment shown, make-up water flow data processor 839 receives binary data structure from signal conditioner and changes sensed data in make-up water flow data structure 837 to a format I/O processor 999 can read. Make-up water flow data processor 839 converts the 4-20 milliamps into the flow rate and creates updated make-up water flow data structure 837a. Updated make-up water flow data structure 837a stores the flow rate. I/O processor 999 pulls data from updated make-up water flow data structure 837a and creates a control object. Flow rate output component control object 837c produced by I/O processor 999 includes data and functions from the I/O processor 999 to execute commands and control systems components. In this exemplary embodiment, make-up water flow output component control object 837c is a data acquisition to sense water levels. In the embodiment shown makeup water flow sensor 835 also assigns a value to flow rate output component control object 837c in order to monitor water loss due to evaporation from UHPWJ water recycling system. Updated values in object are used to open or close a valve as the values in said flow rate output component control object 837c are updated to reflect water levels.

In the embodiment shown, pH value sensor 840 senses the water pH value to maintain a proper pH value for the UHPWJ system. PH value sensor 840 is a pH probe. During normal production operations the valves direct the process liquid across the sensing face of pH value sensor 840 and it gives a signal between 0-10 volts. The sensed data that pH value sensor 840 senses is pH value data structure 842 and is converted to binary data by a signal convertor (not shown) which allows the sensed data in pH value data structure 842 to be read by I/O processor 999.

In the embodiment shown, pH value data processor 844 receives binary data structure from signal conditioner and changes sensed data in pH value data structure 842 to a format I/O processor 999 can read. PH value data processor 844 converts volts into the pH and creates updated pH value data structure 842a. Updated pH value data structure 842a stores the pH value. I/O processor 999 pulls data from updated pH value data structure 842a and creates a control object. PH value component control object 842c produced by I/O processor 999 includes data and functions from the I/O processor 999 to execute commands and control systems components. In this exemplary embodiment, pH value component control object 842c adjusts the feed rate of a chemical that adjusts the pH. Adjusting the chemical is achieved by either opening a valve to let in more chemicals or adjusting the pulse rate of a chemical feed pump. The feed pump may be a diaphragm pump and the chemical would be adjusted by adjusting the stroke and speed of the stroke. PH value component control object 842c automatically maintains the pH of the make-up water within a range set as per the specification for the jet spray operation system.

In the embodiment, water condition sensor 845 monitors the water condition to control ideal water type for the UHPWJ. Water condition sensor 845 is a water hardness combination electrode consisting of measuring electrode, Ag/AgCl reference electrode and temperature sensor. During normal production operations the valves direct the process liquid across the sensing water condition sensor 845 and it reads the conductivity, which is the hardness and the total dissolved solids in the liquids. Water condition sensor 845 then gives a signal between 0-10 volts. The sensed data that water condition sensor 845 senses is water condition data structure 847 and is converted to binary data by a signal convertor (not shown) which allows the sensed data in water condition data structure 847 to be read by I/O processor 999.

In the embodiment shown, water condition data processor 849 receives binary data structure from signal conditioner and changes sensed data in water condition data structure 847 to a format I/O processor 999 can read. Water condition data processor 849 converts volts into the water hardness units and creates updated water condition data structure 847a. Updated water condition data structure 847a stores the water hardness units. I/O processor 999 pulls data from updated water condition data structure 847a and creates a control object. Hardness component control object 847c produced by I/O processor 999 includes data and functions from the I/O processor 999 to execute commands and control systems components. In this exemplary embodiment, hardness component control object 847c makes adjustments to the water softener system (sodium zeolite) to maintain water hardness level with the range of the water jet system specification. Adjusting the chemical is achieved by either opening a valve to let in more chemicals or adjusting the pulse rate of a chemical feed pump.

The feed pump may be a diaphragm pump and the chemical would be adjusted by adjusting the stroke and speed of the stroke.

In the embodiment, pressure differential sensors 850 senses when crumb rubber filters need to be changed. Pressure differential sensors 850 are systems pressure transducers located between the crumb rubber micro filtration units. As crumb rubber passes by, pressure differential sensor 850 senses this pressure and sends a signal to pressure differential data processor 854. This sensed data is pressure differential data structure 852. The signal conditioner (not shown) receives pressure differential data structure 852 from pressure differential sensor 850 and converts it to binary data in the form of binary data structure (not shown). Pressure differential data processor 854 receives binary data structure from signal conditioner and changes sensed data in pressure differential data structure 852 to a format I/O processor 999 can read.

Pressure differential data processor 854 takes sensed data from pressure differential data structure 852 converts it from milliamps to pounds per square inch. Pressure differential data processor 854 creates updated pressure differential data structure 852a which includes the psi. Updated pressure differential data structure 852a stores the psi. I/O processor 999 pulls data from updated pressure differential data structure 852a and creates a control object. Filtration component control object 852c produced by I/O processor 999 includes data and functions from the I/O processor 999 to execute commands and control systems components. In this exemplary embodiment, filtration component control object 852c alerts the processor that it is time to automatically regenerate the mirco filters where the crumb rubber particle distribution separation occurs.

Figure 3:
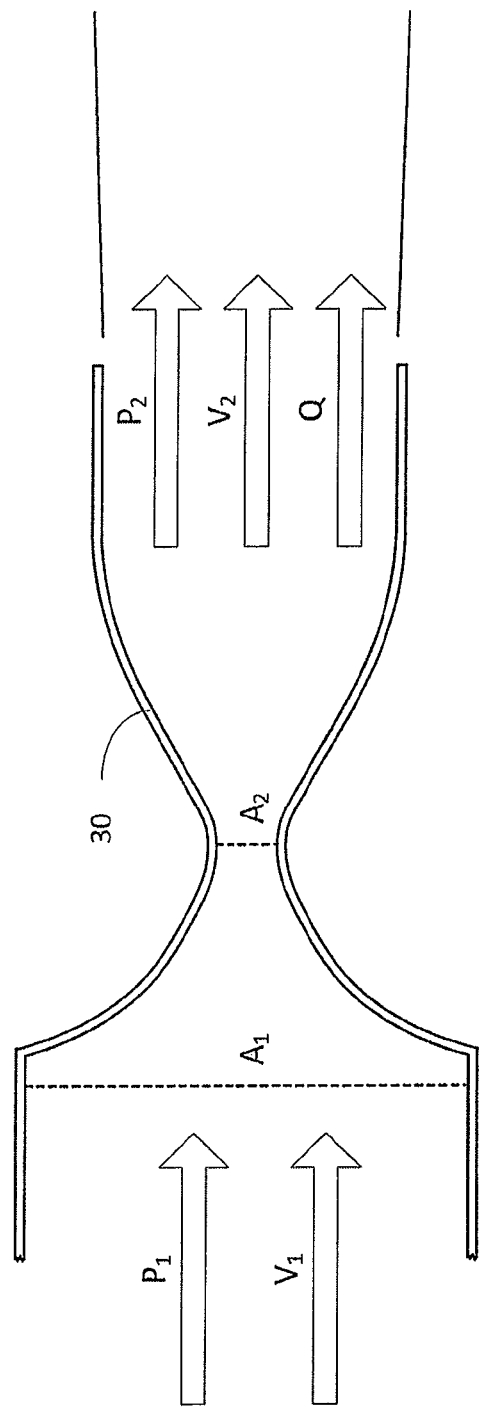
FIG. 3 illustrates a cross sectional view of an exemplary embodiment of a micro-erosion water jet nozzle.

FIG. 3 illustrates the relationship of using the processing components in FIG. 1 to create an "ideal water pressure" at point $P_1$ using the following equations:

$$P_1 + \frac{1}{2} \cdot \rho \cdot V_1^2 = P_2 + \frac{1}{2} \cdot \rho \cdot V_2^2$$

$$P_1 - P_2 = \frac{1}{2} \cdot \rho \cdot \left(\frac{Q}{A_2}\right)^2 - \frac{1}{2} \cdot \rho \cdot \left(\frac{Q}{A_1}\right)^2$$

$$Q = C_d A_2 \sqrt{\frac{1}{1-\beta^4}} \sqrt{2(P_1-P_2)/\rho}$$

In the exemplary embodiment shown, a micro eriosion water jet nozzle 30 having cross-sectional area of the inlet $A_1$ and cross-sectional area of an orifice $A_2$, will be chosen. Water flows through micro eriosion water jet nozzle 30 from a region of high pressure to a region of low pressure. Inlet pressure $P_1$ will be continually measured until an ideal mesh size of the crumb rubber is reached. Cross-sectional area of the inlet $A_1$ and inlet pressure $P_1$ will then be inserted into the equations and the remaining variables will then be calculated.

In the exemplary embodiment shown, $P_1$ will be less than 100,000 psi's.

In the examplary embodiment shown, the greater the mass flow rate Q, or volume (considered Kinetic Energy), the more energy (power) available to micro erode the rubber from the tire tread which increases the speed at which the rubber can be pulverized from the tire therefore increasing through-put or product production. However there is a limit to the flow rate as the additional variables will dictate.

In the exemplary embodiment shown, pressure, $P_1$ and $P_2$, is inversely proportional to velocity, in order to determine the ideal velocity applied to the tire so not to cut the steel belts but achieve ideal micro erosion, the ideal pressure needs to be determined for conversion to velocity which is also dependent on the additional variables.

In the exemplary embodiment shown, velocity, $V_1$ and $V_2$, of the jet stream is critical so not to cut the steel belt and achieve 100% micro erosion. However, maintaining the energy or flow rate is necessary to maximize through-put. Velocity will also be dependent on the additional variables and will be adjusted accordingly via nozzle vena contracta (critical throat area), pressure and flow availability.

In the exemplary embodiment shown, angle of the nozzle and distance from the tire tread will be added to the equation when applicable. The angle of the nozzle off perpendicular relative to the tire tread will be measured in degrees starting at 90 or top dead and moving downward toward 0. As the angle decreases, taking in consideration the additional variables, the micron size of the particle will decrease however through-put will be sacrificed.

Distance relative to the tire surface is also critical and is adjusted based on the outcome of the variables particularly the exit characteristics of the jet stream.

In an exemplary embodiment, there are a few basic rules to remember to understand how the pressure behaves: when the flow accelerates (sub or supersonically) the pressure drops, the pressure rises instantaneously across a shock, the pressure throughout the jet is always the same as the ambient (i.e. the back pressure) unless the jet is supersonic and there are shocks or expansion waves in the jet to produce pressure differences, and the pressure falls across an expansion wave.

Once the flow is choked, the pressure distribution in the converging section doesn't change with the back pressure at all. This is calculated this as follows:

$$P_1 + \tfrac{1}{2} \cdot \rho \cdot V_1^2 = P_2 + \tfrac{1}{2} \cdot \rho \cdot V_2^2$$

or:

$$P_1 - P_2 = \tfrac{1}{2} \cdot \rho \cdot V_2^2 - \tfrac{1}{2} \cdot \rho \cdot V_1^2$$

By contintuity equation:

$$Q = A_1 \cdot V_1 = A_2 \cdot V_2 \; V_1 = Q/A_1 \text{ and } V_2 = Q/A_2$$

$$P_1 - P_2 = \frac{1}{2} \cdot \rho \cdot \left(\frac{Q}{A_2}\right)^2 - \frac{1}{2} \cdot \rho \cdot \left(\frac{Q}{A_1}\right)^2$$

Solving for Q:

$$Q = A_2 \sqrt{\frac{2(P_1-P_2)/\rho}{1-(A_2/A_1)^2}}$$

and:

$$Q = A_2 \sqrt{\frac{1}{1-(d_2/d_1)^4}} \sqrt{2(P_1-P_2)/\rho}$$

The above expression for Q gives the theoretical volume flow rate. Introducing the beta factor $\beta = d_2/d_1$ as well as the coefficient of discharge $C_d$:

$$Q = C_d A_2 \sqrt{\frac{1}{1-\beta^4}} \sqrt{2(P_1 - P_2)/\rho}$$

And finally introducing the meter coefficient C to obtain the final equation for the volumetric flow of the fluid through the orifice:

$$C = \frac{C_d}{\sqrt{1-\beta^4}}$$

$$Q = CA_2 \sqrt{2(P_1 - P_2)/\rho}$$

Multiplying by the density of the fluid to obtain the equation for the mass flow rate at any section in the pipe $$\dot{m} = \rho Q = CA_2 \sqrt{2\rho(P_1 - P_2)}$$

where:
Q=volumetric flow rate (at any cross-section), m³/s (the vena contracta)
$\dot{m}$=mass flow rate (at any cross-section), kg/s
$C_d$=coefficient of discharge, dimensionless
C=orifice flow coefficient, dimensionless
$A_1$=cross-sectional area of the pipe, m²
$A_2$=cross-sectional area of the orifice hole, m²
$d_1$=diameter of the pipe, m
$d_2$=diameter of the orifice hole, m
β=ratio of orifice hole diameter to pipe diameter, dimensionless
$V_1$=upstream fluid velocity, m/s
$V_2$=fluid velocity through the orifice hole, m/s
$P_1$=fluid upstream pressure, Pa with dimensions of kg/(m·s²)
$P_2$=fluid downstream pressure, Pa with dimensions of kg/(m·s²)
ρ=fluid density, kg/m³

Deriving the above equations used the cross-section of the orifice opening and is not as realistic as using the minimum cross-section at the vena contracta. In addition, frictional losses may not be negligible and viscosity and turbulence effects may be present. For that reason, the coefficient of discharge $C_d$ is introduced. The parameter $\sqrt{1-\beta^4}$ is often referred to as the velocity of approach factor and dividing the coefficient of discharge by that parameter (as was done above) produces the flow coefficient C. Methods also exist for determining the flow coefficient as a function of the beta function β and the location of the downstream pressure sensing tap. For rough approximations, the flow coefficient may be assumed to be between 0.60 and 0.75. For a first approximation, a flow coefficient of 0.62 can be used as this approximates to fully developed flow.

Mach number (Ma or M) is the speed of an object, in this case water, moving through air, or any other fluid substance, divided by the speed of sound as it is in that substance for its particular physical conditions, including those of temperature and pressure. It is commonly used to represent the speed of an object when it is traveling close to or above the speed of sound. The Mach number is calculated and logged in real time testing as the flow rate, pressure and velocity variables are adjusted to maximize through-put and particle reduction size (micron).

$$M = \frac{V}{a}$$

where M is the Mach number, V is the relative velocity of the source to the medium, and, a is the speed of sound in the medium.

In this exemplary embodiment, flow rate can be determined by measuring the pressure difference $p_1-p_2$.

The theoretical flow rate q will in practice be smaller (2-40%) due to geometrical conditions.

The ideal equation can be modified with a discharge coefficient:

$$q = C_d A_2 [2(p_1-p_2)/\rho(1-(A_2/A_1)^2)]^{1/2} \quad (3b)$$

where
$c_d$=discharge coefficient
The discharge coefficient $c_d$ is a function of the jet size, or orifice opening, the area ratio=$A_{vc}/A_2$
Where:
$A_{vc}$=area in "vena contracta"
"Vena Contracta" is the minimum jet area that appears just downstream of the restriction. The viscous effect is usually expressed in terms of the non-dimensional parameter.

The velocity of the fluid will be at it's highest and the pressure at the lowest in "Vena Contracta". This equation can be modified with diameters to:

$$q = c_d \pi/4 D_2^2 [2(p_1-p_2)/\rho(1-d^4)]^{1/2} \quad (4)$$

where
$D_2$=orifice, venturi or nozzle inside diameter
$D_1$=upstream and downstream pipe diameter
d=$D_2/D_1$ diameter ratio
π=3.14

This equation can be modified to mass flow for fluids by simply multiplying with the density:

$$\dot{m} = c_d \pi/4 D_2^2 \rho [2(p_1-p_2)/\rho(1-d^4)]^{1/2}$$

What is claimed is:

1. A system for separating recyclable tire materials and for producing crumb rubber and steel, said system comprising:
a pre-micro-erosion module operating under the control of an operations control center and comprising a sidewall and tread cutting unit that outputs at least one flattened tread separated from its corresponding sidewalls; and
a micro-erosion module operating under the control of an operations control center and comprising an ultra-high water pressure jet system comprising a plurality of water jets with outlet nozzles and an ultra-high water pressure processing platform configured to allow independent control of nozzle input water pressure and of nozzle angle position relative to a sidewall or tread to be micro-eroded.

2. The system according to claim 1, further comprising an operations control center, said operations control center comprising a plurality of sensors operably coupled to the operations control center, wherein the operations control center comprises a computer processor, a motor control panel and a power control panel in control communication with the pre-micro-erosion module and the micro-erosion module.

3. The system according to claim 1, wherein the micro-erosion module further comprises water and crumb rubber collection and separation systems and a water treatment and reuse system.

4. The system according to claim 1, further comprising a post-micro-erosion module that comprises a crumb rubber drying system, crumb rubber size classification units, a pulverization mill, crumb rubber and fiber separation units, a crumb rubber bagging unit, and steel and fiber baling units.

5. The system according to claim 1, wherein the ultra-high water pressure processing platform further comprises a tread micro-erosion device and a separate sidewall micro-erosion device.

6. The system according to claim 1, wherein the micro-erosion module further comprises a plurality of ultra-high pressure nozzles in at least one linear array positioned transverse to a direction of tread travel for delivering multiple streams of ultra-high pressure water suitable for producing micro-erosion of tire material.

7. The system according to claim 1, further comprising at least one of a water hardness conditioning apparatus and a water pH conditioning apparatus controlled by the operations control center to maintain water within a range of ultra-high water pressure jet system specifications.

8. The system according to claim 1, further comprising:
- a plurality of tire location sensors to sense the location of a surface of a tire tread component or a sidewall component; and
- a location component control object for receiving sensed tire location data and sending a signal to at least one water jet to direct water jet spray nozzles to cover the full range of the surface the tire tread component or a sidewall component.

\* \* \* \* \*